United States Patent
Yu

(10) Patent No.: US 11,080,322 B2
(45) Date of Patent: Aug. 3, 2021

(54) SEARCH METHODS, SERVERS, AND SYSTEMS

(71) Applicant: Beijing Zhigu Rui Tuo Tech Co., Ltd, Beijing (CN)

(72) Inventor: Kuifei Yu, Beijing (CN)

(73) Assignee: BEIJING ZHIGU RUI TUO TECH CO., LTD, Beijing (CN)

(*) Notice: Subject to any disclaimer, the term of this patent is extended or adjusted under 35 U.S.C. 154(b) by 416 days.

(21) Appl. No.: 15/021,268

(22) PCT Filed: Sep. 9, 2014

(86) PCT No.: PCT/CN2014/086136
§ 371 (c)(1),
(2) Date: Mar. 10, 2016

(87) PCT Pub. No.: WO2015/035897
PCT Pub. Date: Mar. 19, 2015

(65) Prior Publication Data
US 2016/0224554 A1   Aug. 4, 2016

(30) Foreign Application Priority Data
Sep. 12, 2013   (CN) .......................... 201310413683.9

(51) Int. Cl.
*G06F 16/48*   (2019.01)
*G06F 16/2458*   (2019.01)
(Continued)

(52) U.S. Cl.
CPC .......... *G06F 16/48* (2019.01); *G06F 16/2471* (2019.01); *G06F 16/9535* (2019.01);
(Continued)

(58) Field of Classification Search
CPC ..................................................... G06F 16/48
(Continued)

(56) References Cited

U.S. PATENT DOCUMENTS 7,069,262 B1   6/2006   Go
7,451,185 B2 *  11/2008   Morris .................. G06F 16/958
                                              709/206
(Continued)

FOREIGN PATENT DOCUMENTS

CN   1794776 A   6/2006
CN   101668255 A   3/2010
(Continued)

OTHER PUBLICATIONS

"Context Search" dated Apr. 26, 2014, published online at [https://addons.mozilla.org/zh-cn/firefox/addon/context-search/], retrieved on Mar. 10, 2016, 6 pages (with English translation dated Apr. 26, 2014, published online at [https://addons.mozilla.org/en-US/firefox/addon/context-search/] and retrieved on Mar. 10, 2016).
(Continued)

*Primary Examiner* — Eliyah S. Harper
(74) *Attorney, Agent, or Firm* — Amin, Turocy & Watson, LLP

(57) ABSTRACT

A search method comprises receiving attribute information and environment information of a search object which are sent by a terminal, calculating content of the search object and context of the search object according to the attribute information and environment information of the search object, and searching according to the content of the search object and the context of the search object to obtain a search result leveraging the computing capability of the search server, and thereby accomplishing searching based on the attribute information and environment information of the search object without sending content of a search object together with context of the search object to a search server. Data traffic is decreased while high search efficiency is ensured, and moreover, electric energy loss on the terminal side during data communication is reduced.

47 Claims, 7 Drawing Sheets

(51) Int. Cl.
*G06F 16/955* (2019.01)
*G06F 16/9535* (2019.01)
*G06F 40/14* (2020.01)
*H04L 29/08* (2006.01)

(52) U.S. Cl.
CPC .......... *G06F 16/9566* (2019.01); *G06F 40/14* (2020.01); *H04L 67/02* (2013.01); *Y02D 10/00* (2018.01)

(58) Field of Classification Search
USPC .......................................................... 707/770
See application file for complete search history.

(56) References Cited

U.S. PATENT DOCUMENTS

| | | | | |
|---|---|---|---|---|
| 2006/0106825 | A1* | 5/2006 | Cozzi | G06F 16/288 |
| 2007/0050519 | A1* | 3/2007 | Cano | H04L 67/1095 |
| | | | | 709/238 |
| 2010/0094876 | A1 | 4/2010 | Huang et al. | |
| 2011/0112832 | A1* | 5/2011 | Prorock | G11B 27/36 |
| | | | | 704/235 |
| 2012/0166432 | A1* | 6/2012 | Tseng | G06F 16/24578 |
| | | | | 707/728 |
| 2013/0097554 | A1* | 4/2013 | Wyeld | G06T 19/00 |
| | | | | 715/782 |
| 2015/0039590 | A1 | 2/2015 | Kim et al. | |

FOREIGN PATENT DOCUMENTS

| | | |
|---|---|---|
| CN | 102902771 A | 1/2013 |
| CN | 102905045 A | 1/2013 |
| CN | 103092972 A | 5/2013 |
| CN | 103176996 A | 6/2013 |
| CN | 103559194 A | 2/2014 |
| CN | 103559195 A | 2/2014 |

OTHER PUBLICATIONS

"Search Selected Text with Google Chrome", published Sep. 16, 2008 online at [http://www.chromeplugins.org/chrome/search-selected-text-with-google-chrome/], retrieved on Mar. 10, 2016, 9 pages.
Finkelstein, et al. "Placing Search in Context: The Concept Revisited", WWW10, May 2-5, 2001, Hong Kong, published online at [http://wwwconference.org/www10/cdrom/papers/431/index.html], retrieved on Mar. 10, 2016, 10 pages.
International Search Report dated Dec. 12, 2014 for PCT Application No. PCT/CN2014/086136, 2 pages.
Non-Final Office Action received for U.S. Appl. No. 15/021,267 dated Feb. 21, 2019, 77 pages.
Wand et al., "Method and system for testing application compatibility of intelligent terminal", URL: https://patents.google.com/patent/CN103516559A/en?oq =CN+103516559A, Dec. 13, 2012, 20 pages.
International Search Report dated Dec. 17, 2014 for PCT Application No. PCT/CN2014/086138, 2 pages.

* cited by examiner

SEARCH METHODS, SERVERS, AND SYSTEMS

RELATED APPLICATION

The present application is a U.S. National Stage filing under 35 U.S.C. § 371 of international patent cooperation treaty (PCT) application No. PCT/CN2014/086136, filed Sep. 9, 2014, and entitled "SEARCH METHODS, SERVERS, AND SYSTEMS", which claims the benefit of priority to Chinese Patent Application No. 201310413683.9, filed on Sep. 12, 2013, which applications are hereby incorporated into the present application by reference herein in their respective entireties.

TECHNICAL FIELD

The present application relates to the field of communications technologies, and in particular, to various search methods, servers, and systems.

BACKGROUND

With the popularization of mobile terminals, various mobile terminals such as mobile phones and tablet computers appear in people's daily life. People use mobile terminals to browse web pages more often, and may perform a search while browsing web pages.

In an existing search method, a mobile terminal usually sends a search object to a server directly, and the server sends a search result to the mobile terminal after the search is completed. However, a highly efficient search not only relies on the search object, but also relies on context of the search object. Therefore, in some context-based search methods, both a search object and context of the search object are sent to a server; the server obtains a search result based on the search object and the context of the search object, and then sends the search result to the mobile terminal.

In the foregoing context-based search method, because a mobile terminal sends a search object together with context of the search object to a server, large data traffic is generated, and in addition, great electric energy loss is caused, which reduces the battery life of the mobile terminal.

SUMMARY

Objectives of the present application are to provide various search methods, servers, and systems, so as to solve the problem of large data traffic that occurs when search efficiency is improved in an existing search method.

According to one example embodiment of the embodiments of the present application, a search method is provided, comprising:

receiving attribute information and environment information of a search object which are sent by a terminal;

calculating content of the search object and context of the search object according to the attribute information and environment information of the search object; and searching according to the content of the search object and the context of the search object to obtain a search result.

According to another example embodiment of the embodiments of the present application, a search server is provided, comprising:

a server communication unit, configured to receive attribute information and environment information of a search object which are sent by a terminal;

a processing unit, configured to calculate content of the search object and context of the search object according to the attribute information and environment information of the search object; and a search unit, configured to search according to the content of the search object and the context of the search object to obtain a search result.

According to another example embodiment of the embodiments of the present application, a search method is provided, comprising:

selecting, by a terminal, a search object in a media resource according to an input instruction;

acquiring, by the terminal, attribute information and environment information of the search object;

sending, by the terminal, the attribute information and environment information of the search object to a search server;

receiving, by the search server, the attribute information and environment information of the search object which are sent by the terminal;

calculating, by the search server, content of the search object and context of the search object according to the attribute information and environment information of the search object; and searching, by the search server, according to the content of the search object and the context of the search object to obtain a search result.

According to another example embodiment of the embodiments of the present application, a search system is provided, comprising: a terminal and a search server, where the terminal comprises: an object selection unit, an information acquisition unit, and a terminal communication unit;

the object selection unit is configured to select a search object in a media resource according to an input instruction;

the information acquisition unit is configured to acquire attribute information and environment information of the search object; and the terminal communication unit is configured to send the attribute information and environment information of the search object to the search server; and the search server comprises: a server communication unit, a processing unit, and a search unit;

the server communication unit is configured to receive the attribute information and environment information of the search object which are sent by the terminal;

the processing unit is configured to calculate content of the search object and context of the search object according to the attribute information and environment information of the search object; and the search unit is configured to search according to the content of the search object and the context of the search object to obtain a search result.

According to another example embodiment of the present application, provided is a computer readable storage device, the computer readable storage device comprising at least one executable instruction, which, in response to execution, causes a search server comprising a processor to perform operations, comprising:

receiving attribute information and environment information of a search object which are sent by a terminal;

calculating content of the search object and context of the search object according to the attribute information and environment information of the search object; and searching according to the content of the search object and the context of the search object to obtain a search result.

According to another example embodiment of the present application, provided is a search server, the search server comprising a processor and a memory, the memory storing computer executable instructions, the processor being connected to the memory via a communication bus, and when the search server operates, the processor executes the computer executable instructions stored in the memory, so that the search server executes operations, comprising:

receiving attribute information and environment information of a search object which are sent by a terminal;

calculating content of the search object and context of the search object according to the attribute information and environment information of the search object; and searching according to the content of the search object and the context of the search object to obtain a search result.

According to another example embodiment of the present application, provided is a computer readable storage device, the computer readable storage device comprising at least one executable instruction, which, in response to execution, causes a search sestem comprising a processor to perform operations, comprising:

selecting, by a terminal, a search object in a media resource according to an input instruction;

acquiring, by the terminal, attribute information and environment information of the search object;

sending, by the terminal, the attribute information and environment information of the search object to a search server;

receiving, by the search server, the attribute information and environment information of the search object which are sent by the terminal;

calculating, by the search server, content of the search object and context of the search object according to the attribute information and environment information of the search object; and searching, by the search server, according to the content of the search object and the context of the search object to obtain a search result.

According to another example embodiment of the present application, provided is a search system, the search system comprising a processor and a memory, the memory storing computer executable instructions, the processor being connected to the memory via a communication bus, and when the search system operates, the processor executes the computer executable instructions stored in the memory, so that the search system executes operations, comprising:

selecting, by a terminal, a search object in a media resource according to an input instruction;

acquiring, by the terminal, attribute information and environment information of the search object;

sending, by the terminal, the attribute information and environment information of the search object to a search server;

receiving, by the search server, the attribute information and environment information of the search object which are sent by the terminal;

calculating, by the search server, content of the search object and context of the search object according to the attribute information and environment information of the search object; and searching, by the search server, according to the content of the search object and the context of the search object to obtain a search result.

In the various search methods, servers, and systems according to the present application, the search server receives attribute information and environment information of a search object which are sent by a terminal, and then the search server calculates content of the search object and context of the search object according to the attribute information and environment information of the search object, thereby accomplishing a corresponding searching task. The search method, server, and system take full advantage of a strong computing capability of the search server, and accomplish searching based on the attribute information and environment information of the search object, thereby solving the problem of large data traffic that occurs in conventional systems because a terminal of the conventional systems sends content of a search object together with context of the search object to a search server. As a result of the various embodiments herein, data traffic is decreased while high search efficiency is ensured, and moreover, electric energy loss on the terminal side during data communication is reduced.

DETAILED DESCRIPTION

The following describes the specific implementation manners of the present application in further detail with reference to the accompanying drawings and embodiments. The following embodiments are used for describing the present application, but are not intended to limit the scope of the present application.

Figure 1:
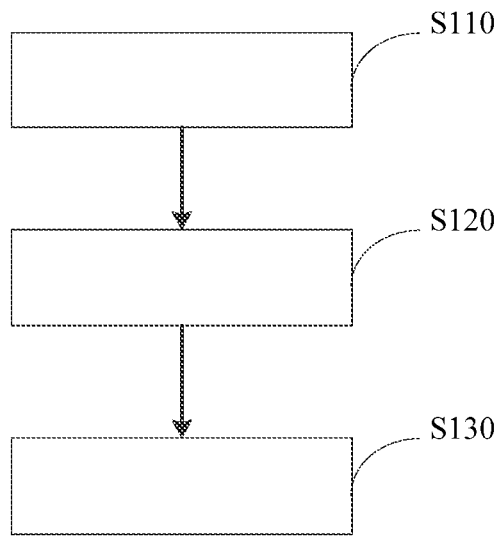
FIG. 1 is an example flowchart of a search method according to an embodiment of the present application.

An embodiment of the present application provides a search method, and the method is generally executed by a search server. FIG. 1 is a flowchart of a search method according to an embodiment of the present application. As shown in FIG. 1, the method comprises:

S110: Receive attribute information and environment information of a search object which are sent by a terminal.

The terminal may be a mobile terminal such as a smart phone, a tablet computer, or a notebook computer, and may also be a device such as a desktop computer. The search object may be text, an image, a video file, an audio file, or the like. The attribute information of the search object may be area information of the search object, and may also directly be content of the search object. The environment information of the search object may be a resource identity (ID) of a media source to which the search object belongs, or a resource ID of a media resource to which the search object belongs and type information of the terminal, or merely type information of the terminal. The media resource to which the search object belongs may be a web page, a Word document, an Excel chart, a PowerPoint file, or the like; correspondingly, the resource ID is generally a universal resource identifier (URI) of a web page, a Word document, an Excel chart, a PowerPoint file, or the like. A URI of a web page is a universal resource locator (URL) of the web page. The type information of the terminal generally comprises information such as brand, model, and version number of the terminal, and type description information of the terminal can be acquired according to the type information of the terminal.

S120: Calculate content of the search object and context of the search object according to the attribute information and environment information of the search object.

When the attribute information of the search object is directly content of the search object, the search server may obtain content of the media resource to which the search object belongs according to a resource ID in the environment information of the search object, thereby obtaining context of the search object through calculation with reference to the content of the search object. For example, when the search object is an English word on a web page, content of the web page to which the search object belongs can be obtained according to the resource ID (namely, the URL of the web page), and then a paragraph where the English word is located may be selected as context of the search object. When the attribute information of the search object is area information of the search object, the search server first obtains, according to the environment information of the search object, a display layout comprising the search object, thereby determining the search object through calculation with reference to the area information, and then determines context of the search object through calculation. This case will be described in detail in the following.

S130: Search according to the content of the search object and the context of the search object to obtain a search result.

After the content of the search object and the context of the search object are determined, the search server may perform context-based searching by using an existing search method, to obtain a search result, and further sends the search result to the terminal.

In the search method according to the embodiment of the present application, a search server only receives attribute information and environment information of a search object which are sent by a terminal, and the search server calculates content of the search object and context of the search object according to the attribute information and environment information of the search object, thereby accomplishing a corresponding searching task. The method takes full advantage of a strong computing capability of the search server, and accomplishes searching based on the attribute information and environment information of the search object, thereby solving the problem of large data traffic that occurs in the prior art because a terminal needs to send content of a search object together with context of the search object to a search server. Therefore, data traffic is decreased while high search efficiency is ensured, and moreover, electric energy loss on the terminal side during data communication is reduced.

Figure 2A:
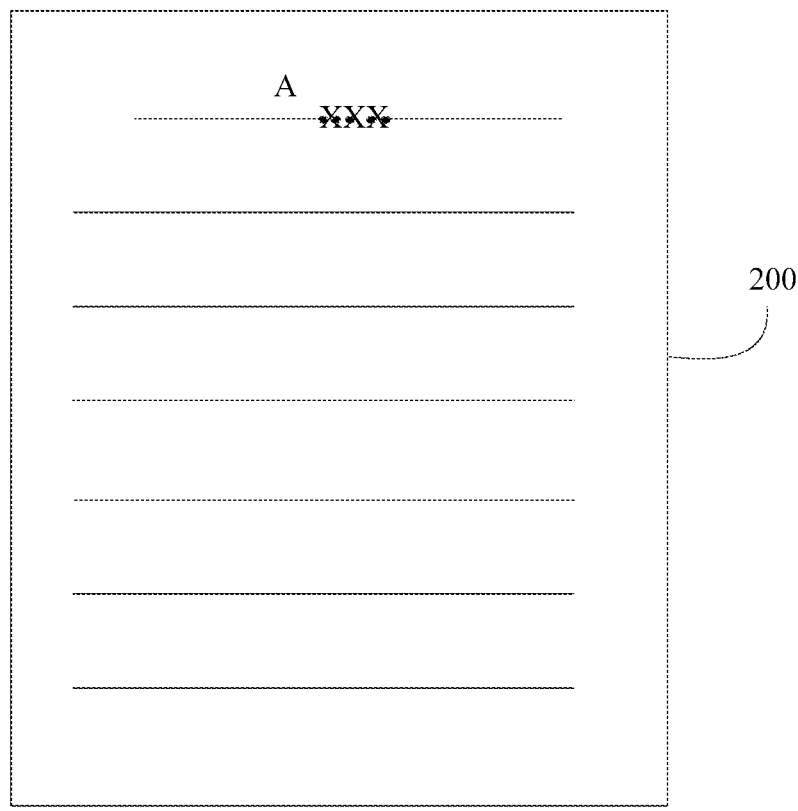
FIG. 2a is an example schematic diagram of a type of area information of a search object according to an embodiment of the present application.

Specifically, the area information of the search object may be start coordinates of the search object in the media resource to which the search object belongs, and a length of the search object. FIG. 2 is a schematic diagram of a type of area information of a search object according to an embodiment of the present application. As shown in FIG. 2a, in a media resource 200 (such as a web page), start coordinates of the search object (namely, XXX) in the media resource to which the search object belongs are coordinates of pixel A in FIG. 2a; the length of the search object is the number of pixels from start to end of the search object, and in FIG. 2a, the length of the search object is 5. In other words, the start coordinates of the search object are coordinates of the first pixel of the search object in the media resource to which the search object belongs, and the length of the search object is the number of pixels between the first pixel and the last pixel of the search object in the media resource to which the search object belongs.

Figure 2B:
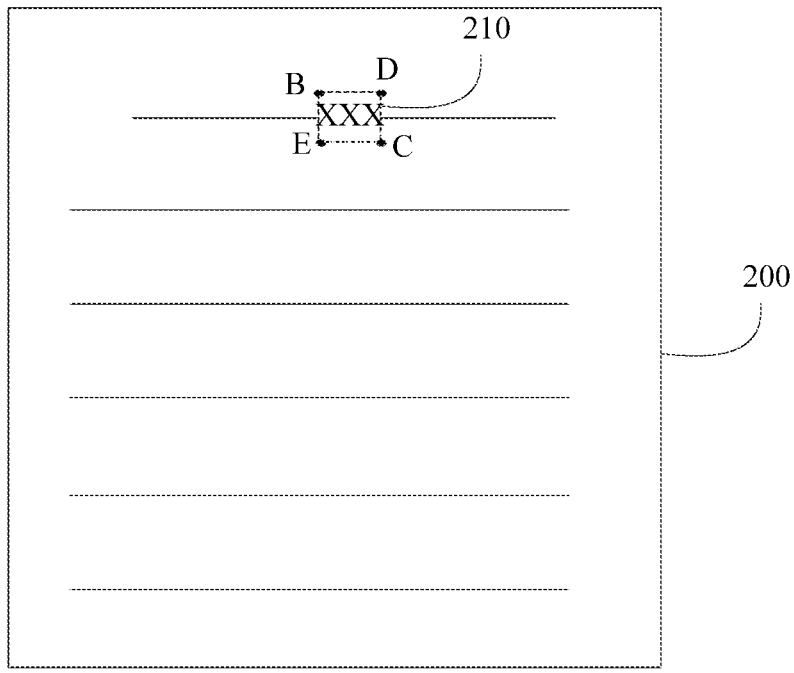
FIG. 2b is an example schematic diagram of another type of area information of a search object according to an embodiment of the present application.

The area information of the search object may also be opposite corner coordinates of the search object in the media resource to which the search object belongs. FIG. 2b is a schematic diagram of another type of area information of a search object according to an embodiment of the present application. As shown in FIG. 2b, in a media resource 200 (such as a web page), the block area surrounded by dashed lines is the area where the search object 210 is located. The opposite corner coordinates of the search object in the media resource to which the search object belongs are coordinates of point B and point C, or coordinates of point D and point E. In other words, the opposite corner coordinates of the search object in the media resource to which the search object belongs are coordinates of two endpoints of one of the diagonal lines of a minimum rectangle comprising the search object.

Figure 2C:
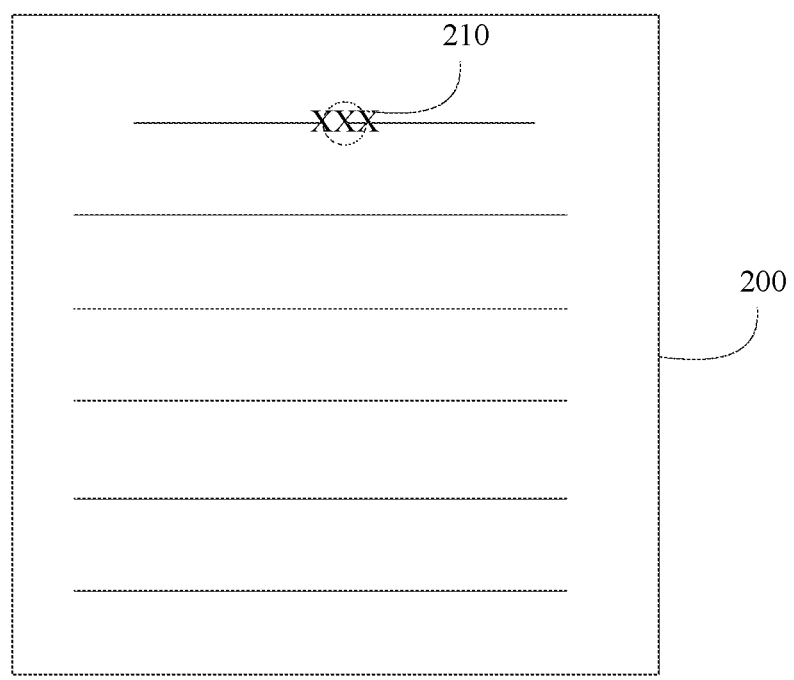
FIG. 2c is an example schematic diagram of still another type of area information of a search object according to an embodiment of the present application.

The area information of the search object may also be center coordinates and a radius of the search object in the media resource to which the search object belongs. FIG. 2c is a schematic diagram of still another type of area information of a search object according to an embodiment of the present application. As shown in FIG. 2c, in a media resource 200 (such as a web page), the circular area surrounded by a dashed line is the area where the search object 210 is located. The center coordinates of the search object in the media resource to which the search object belongs are coordinates of the center of the circular area surrounded by the dashed line, and the radius of the search object in the media resource to which the search object belongs is also the radius of the circular area surrounded by the dashed line. In other words, the center coordinates of the search object in the media resource to which the search object belongs are coordinates of the center of a minimum circle comprising the search object, and the radius of the search object in the media resource to which the search object belongs is the radius of the minimum circle.

In addition, apart from the foregoing specific forms of the area information, the area information of the search object may also be in another form, for example, coordinates of three vertices of a minimum triangle comprising the search object; or focal coordinates, a length of the major axis, and a length of the minor axis of a minimum ellipse comprising the search object; or a coordinate sequence comprising the search object.

An image, a video file, or an audio file generally has a large size, and therefore, when such manner in which the terminal sends the area information of the search object to the search server and the search server determines the content of the search object through calculation is applied to the search of non-text files such as an image, a video file, and an audio file, data traffic can be reduced more effectively.

To ensure high efficiency of the search, apart from receiving the attribute information of the search object, the search server further needs to receive the environment information of the search object, so that the search server can search based on the context of the search object, to obtain a search result needed by the user.

The environment information of the search object may be a resource ID of the media resource to which the search object belongs. The resource ID may be a URI, and generally comprises: universal file IDs (such as a File Transfer Protocol (FTP) address) applicable to various network servers or a web page ID (generally a URL); besides, the resource ID may also be a file ID using a predetermined marking manner on a predetermined cloud server. When the attribute information of the search object is content of the search object, the environment information of the search object only needs to comprise a resource ID of the media resource to which the search object belongs. In this way, after receiving the attribute information and environment information of the search object, the search server can acquire the media resource to which the search object belongs according to the resource ID, and obtain context of the search object through calculation with reference to the content of the search object, thereby accomplishing context-based searching.

The environment information of the search object may be a resource ID of the media resource to which the search object belongs and type information of the terminal. When the attribute information of the search object is area information of the search object, the search server cannot directly acquire content of the search object from the terminal. Therefore, the search server needs to obtain, according to the resource ID of the media resource to which the search object belongs and the type information of the terminal, a display layout comprising the search object, thereby acquiring the content and context of the search object through calculation with reference to the area information of the search object. Generally, the search server may automatically acquire type description information of the terminal according to the type information of the terminal, for example, the search server may acquire type description information corresponding to the type information of the terminal by means of searching on the Internet, or the terminal automatically uploads the type information and corresponding type description information thereof when a client is installed on the terminal or the terminal is connected to the search server for the first time, and the search server may acquire the corresponding type description information by searching a local memory according to the type information of the terminal. The type description information comprises: at least one of a default cascading style sheet (CSS) file, a font, and parameter related information of the terminal.

When the search server is a comprehensive server that provides the terminal with a data distribution service and a search service at the same time, the environment information of the search object may be merely type information of the terminal. Because a media resource currently browsed by the terminal is sent by the comprehensive server, the comprehensive server may automatically acquire the resource ID of the media resource to which the search object belongs according to a distribution history, then with reference to the type information of the terminal, the search server can obtain a display layout comprising the search object, thereby acquiring the content and context of the search object through calculation with reference to the area information of the search object. In this case, before Step S120, the method further comprises the following step:

S210: Acquire a resource ID of a media resource to which the search object belongs.

Correspondingly, Step S120 is as follows: Calculate content of the search object and context of the search object according to the attribute information and environment information of the search object, and the resource ID.

In addition, the environment information of the search object may further comprise information such as a position of the terminal, an ambient temperature, and ambient humidity, so as to further improve the search efficiency of the search server.

As described above, generally, the search server may automatically acquire the type description information of the terminal according to the type information of the terminal; in other words, before Step S120, the method further comprises the following step:

S310: Obtain type description information of the terminal according to the type information of the terminal.

Meanwhile, during an application process, the search server may fail to recognize the type information sent by the terminal, for example, the type information of the terminal is not common and the terminal does not upload corresponding type description information previously. In this case, the search server may send a type description request to the terminal, so as to request the terminal to describe the type information; in other words, before Step S120, the method further comprises:

S410: Send a type description request to the terminal according to the type information of the terminal.

S420: Receive type description information of the terminal that is sent by the terminal according to the type description request.

When the attribute information of the search object is area information of the search object, and the environment information of the search object comprises type information of the terminal, the search server may acquire type description information of the terminal according to the type information of the terminal in the foregoing two manners. In addition, the search server may obtain the resource ID of the media resource to which the search object belongs from the environment information (that is, the environment information of the search object further comprises the resource ID of the media resource to which the search object belongs), and may also automatically acquire the resource ID of the media resource to which the search object belongs according to a resource distribution history. In this case, Step S120 may comprise:

S121: Obtain, according to the type description information of the terminal and the resource ID, a display layout comprising the search object.

The type description information may comprise: a default CSS file, a font, and parameter related information of the terminal. The default CSS file is mainly used in a case in which the media resource to which the search object belongs is a web page, and the search server can obtain a CSS file corresponding to the search object according to the default CSS file and an embedded CSS file of the web page. The parameter related information may be parameter information of the terminal, and may also be a screenshot of the terminal; the search server may carry out analysis according to the screenshot, to obtain parameter information of the terminal. The parameter information generally is a screen size, resolution, and the like of the terminal.

S122: Calculate the content of the search object and the context of the search object according to the attribute information of the search object and the display layout.

After the display layout comprising the search object is determined, a manner of calculating the content of the search object according to the area information in the attribute information of the search object is similar to determining, on the terminal side, the content of the search object according to the area information of the search object, except that the search server does not need to present the display layout.

In addition, the embodiments of the present application also provide a computer readable storage medium, comprising at least one executable instruction, which perform the following operations when being executed: executing the operations of S110, S120 and S130 of the method in the implementation shown in FIG. 1.

Figure 3:
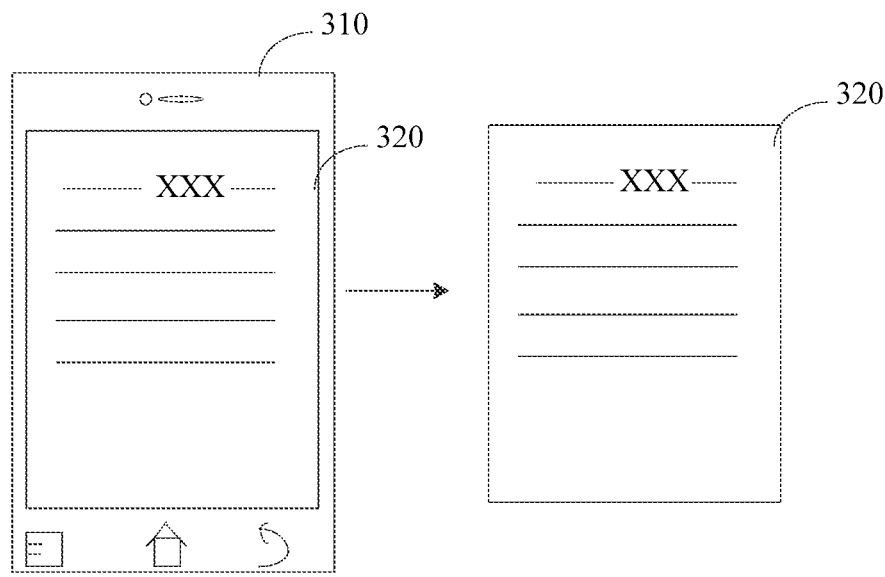
FIG. 3 is an example schematic diagram of a display layout according to an embodiment of the present application.

FIG. 3 is a schematic diagram of a display layout according to an embodiment of the present application. As shown in FIG. 3, it is assumed that a search object (XXX in FIG. 3) on a web page is displayed on a display screen of a smart phone 310, and corresponding to influencing parameters such as screen size, resolution, font, and default CSS file of the smart phone 310, the web page is displayed in a matching format. Therefore, on search server side, the search server first obtains, according to parameters such as screen size, resolution, font, and default CSS file of the smart phone 310 (namely, the type description information of the terminal) and a web page URL (namely, the resource ID, where web page content is acquired mainly according to the web page URL), a display layout 320 comprising the search object. In the display layout 320, web page content comprising the search object may be displayed in an analog manner according to a same display format on the terminal side; in other words, the display layout 320 does not need to be presented in a real sense, but only displayed in an analog manner in a memory of the search server.

When the resource ID is a URI, Step S121 may specifically comprise the following steps:

S1211: Acquire version information, document type information, and document content information of the media resource to which the search object belongs according to the URI.

S1212: Obtain parameter information of the terminal according to the parameter related information of the terminal.

S1213: Obtain, according to the version information, document type information, and document content information of the media resource to which the search object belongs and the parameter information of the terminal, the display layout comprising the search object.

The media resource herein generally is a document, for example, a Word file, an Excel chart, or a PowerPoint file stored on a cloud server. When the URI is a URL, that is, when the media resource to which the search object belongs is a web page, Step S121 may specifically comprise the following steps:

S1211': Obtain an embedded CSS file of a webpage to which the search object belongs according to the URL.

S1212': Obtain a CSS file corresponding to the search object according to the default CSS file and the embedded CSS file. The default CSS file is a CSS file that can be supported by the terminal, the embedded CSS file is a CSS file applicable to the web page, and an intersection of the default CSS and the embedded CSS file generally is a CSS file corresponding to the search object, that is, a CSS file actually used by the search object.

S1213': Obtain parameter information of the terminal according to the parameter related information of the terminal.

S1214': Obtain, according to the CSS corresponding to the search object, the font and parameter information of the terminal, and the URL, the display layout comprising the search object.

In conclusion, in the method of this embodiment, on the search server side, content of a search object is determined first through calculation based on area information and environment information of the search object, then context of the search object is obtained through calculation, and finally context-based searching is accomplished. Therefore, the amount of data sent by a terminal to the search server during searching is decreased, and moreover, electric energy loss of the terminal during searching is reduced.

Figure 4:
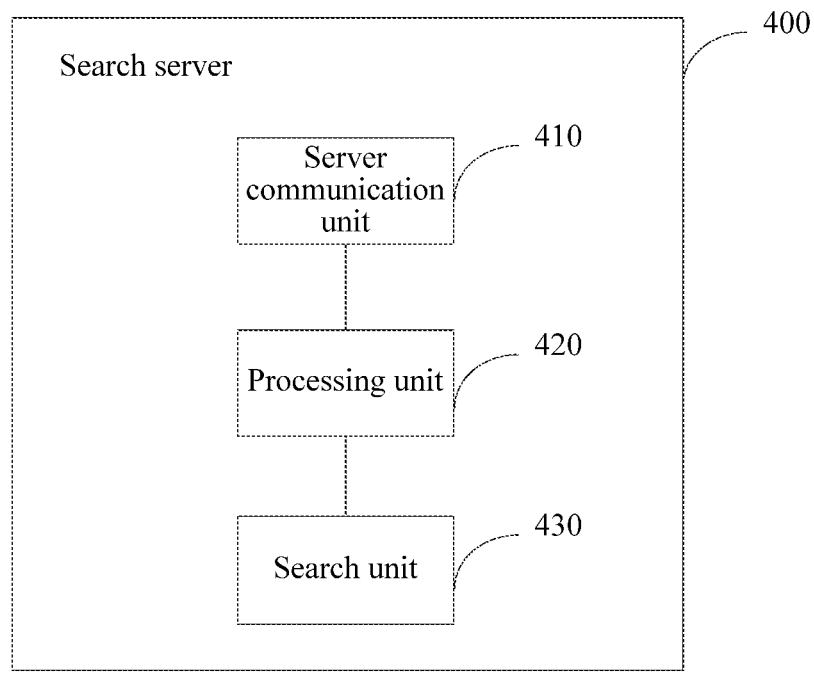
FIG. 4 is an example schematic structural diagram of modules of a search server according to an embodiment of the present application.

FIG. 4 is a schematic structural diagram of modules of a search server according to an embodiment of the present application. As shown in FIG. 4, the search server 400 comprises: a server communication unit 410, a processing unit 420, and a search unit 430. The search server 400 may be a server only providing a search service, and may also be a comprehensive server providing a search service and a data distribution service at the same time.

The server communication unit 410 is configured to receive attribute information and environment information of a search object which are sent by a terminal.

The search object may be text, an image, a video file, an audio file, or the like. The attribute information of the search object may be area information of the search object, and may also directly be content of the search object. The environment information of the search object may be a resource ID of a media resource to which the search object belongs, or a resource ID of a media resource to which the search object belongs and type information of the terminal, or merely type information of the terminal. The media resource to which the search object belongs may be a web page, a Word document, an Excel chart, a PowerPoint file, or the like; correspondingly, the resource ID is generally a URI of a web page, a Word document, an Excel chart, a PowerPoint file, or the like. A URI of a web page is a URL of the web page. The type information of the terminal generally comprises information such as brand, model, and version number of the terminal, and type description information of the terminal can be acquired according to the type information of the terminal.

The processing unit 420 is configured to calculate content of the search object and context of the search object according to the attribute information and environment information of the search object.

When the attribute information of the search object is directly content of the search object, the processing unit 420 can obtain content of the media resource to which the search object belongs according to a resource ID in the environment information of the search object, thereby obtaining context of the search object through calculation with reference to the content of the search object. For example, when the search object is an English word on a web page, content of the web page to which the search object belongs can be obtained according to the resource ID (namely, the URL of the web page), and then a paragraph where the English word is located may be selected as context of the search object. When the attribute information of the search object is area information of the search object, the processing unit 420 first obtains, according to the environment information of the search object, a display layout comprising the search object, thereby determining the search object through calculation with reference to the area information, and then determines context of the search object through calculation. This case will be described in detail in the following.

The search unit 430 is configured to search according to the content of the search object and the context of the search object to obtain a search result.

After the content of the search object and the context of the search object are determined, the search unit 430 may perform context-based searching by using an existing search method, to obtain a search result. In addition, the server communication unit 410 generally is further configured to send the search result to the terminal.

The search server according to the embodiment of the present application only receives attribute information and environment information of a search object which are sent by a terminal, and calculates content of the search object and context of the search object according to the attribute information and environment information of the search object, thereby accomplishing a corresponding searching task. The search server takes full advantage of a strong computing capability thereof, and accomplishes searching based on the attribute information and environment information of the search object, thereby solving the problem of large data traffic that occurs in the prior art because a terminal needs to send content of a search object together with context of the search object to a search server. Therefore, data traffic from the terminal to the search server is decreased while high search efficiency is ensured, and moreover, electric energy loss on the terminal side during a searching process is reduced.

Specifically, the area information of the search object may be start coordinates of the search object in the media resource to which the search object belongs, and a length of the search object. As shown in FIG. 2a, in a media resource 200 (such as a web page), start coordinates of the search object (namely, XXX) in the media resource to which the search object belongs are coordinates of pixel A in FIG. 2a; the length of the search object is the number of pixels from start to end the search object, and in FIG. 2a, the length of the search object is 5. In other words, the start coordinates of the search object are coordinates of the first pixel of the search object in the media resource to which the search object belongs, and the length of the search object is the number of pixels between the first pixel and the last pixel of the search object in the media resource to which the search object belongs.

The area information of the search object may also be opposite corner coordinates of the search object in the media resource to which the search object belongs. As shown in FIG. 2b, in a media resource 200 (such as a web page), the block area surrounded by dashed lines is the area where the search object 210 is located. The opposite corner coordinates of the search object in the media resource to which the search object belongs are coordinates of point B and point C, or coordinates of point D and point E. In other words, the opposite corner coordinates of the search object the media resource to which the search object belongs are coordinates of two endpoints of one of the diagonal lines of a minimum rectangle comprising the search object.

The area information of the search object may also be center coordinates and a radius of the search object in the media resource to which the search object belongs. As shown in FIG. 2c, in a media resource 200 (such as a web page), the circular area surrounded by a dashed line is the area where the search object 210 is located. The center coordinates of the search object in the media resource to which the search object belongs are coordinates of the center of the circular area surrounded by the dashed line, and the radius of the search object in the media resource to which the search object belongs is also the radius of the circular area surrounded by the dashed line. In other words, the center coordinates of the search object in the media resource to which the search object belongs are coordinates of the center of a minimum circle comprising the search object, and the radius of the search object in the media resource to which the search object belongs is the radius of the minimum circle.

In addition, apart from the foregoing specific forms of the area information, the area information of the search object may also be in another form, for example, coordinates of three vertices of a minimum triangle comprising the search object; or focal coordinates, a length of the major axis, and a length of the minor axis of a minimum ellipse comprising the search object; or a coordinate sequence comprising the search object.

An image, a video file, or an audio file generally has a large size, and therefore, when such manner in which the terminal sends the area information of the search object to the search server and the search server determines the content of the search object through calculation is applied to the search of non-text files such as an image, a video file, and an audio file, data traffic can be reduced more effectively.

To ensure high efficiency of the search, apart from receiving the attribute information of the search object, the search server further needs to receive the environment information of the search server, so that the search server can search based on the context of the search object, to obtain a search result needed by the user.

The environment information of the search object may be a resource ID of the media resource to which the search object belongs. The resource ID may be a URI, and generally comprises: universal file IDs (such as an FTP address) applicable to various network servers or a web page ID (generally a URL); besides, the resource ID may also be a file ID using a predetermined marking manner on a predetermined cloud server. When the attribute information of the search object is content of the search object, the environment information of the search object only needs to comprise a resource ID of the media resource to which the search object belongs. In this way, after the server communication unit 410 receives the attribute information and environment information of the search object, the processing unit 420 can acquire the media resource to which the search object belongs according to the resource ID, and obtain context of the search object through calculation with reference to the content of the search object; thereby, the search unit 430 accomplishes context-based searching.

The environment information of the search object may be a resource ID of the media resource to which the search object belongs and type information of the terminal. When the attribute information of the search object is area information of the search object, the search server 400 cannot directly acquire content of the search object from the terminal. Therefore, the processing unit 420 needs to obtain, according to the resource ID of the media resource to which the search object belongs and the type information of the terminal, a display layout comprising the search object, thereby acquiring the content and context of the search object through calculation with reference to the area information of the search object. Generally, the processing unit 420 does not process the type information directly, but processes type description information corresponding to the type information. The type description information comprises: at least one of a default CSS file, a font, and parameter related information of the terminal.

Figure 5:
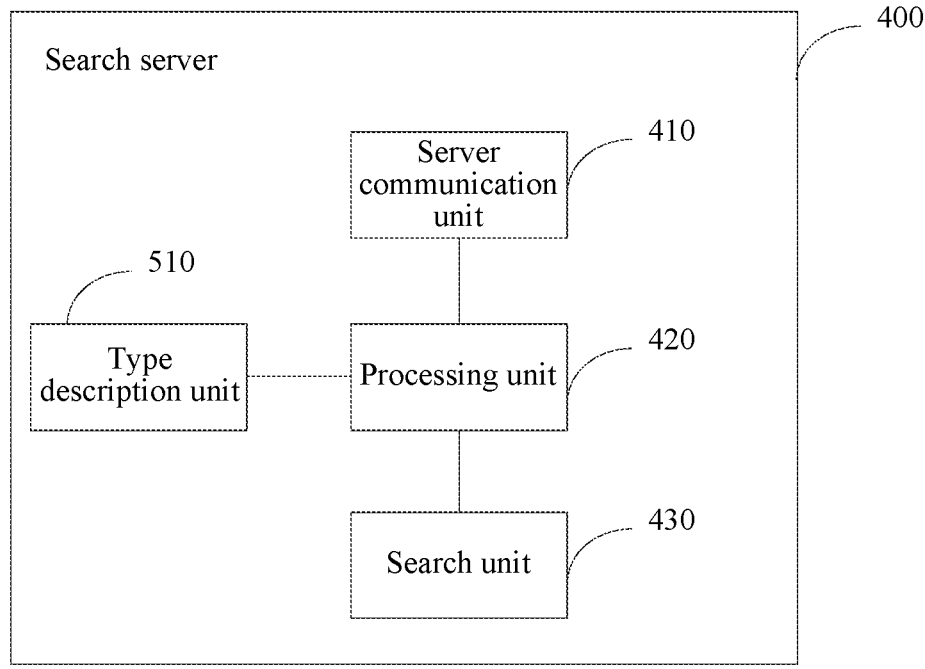
FIG. 5 is an example schematic structural diagram of modules in an implementation manner of a search server according to an embodiment of the present application.

Referring to FIG. 5, in an implementation manner of the embodiment of the present application, in order to acquire type description information of the terminal according to the type information of the terminal, the search server 400 generally further comprises: a type description unit 510. The type description unit 510 is configured to obtain type description information of the terminal according to the type information of the terminal. For example, the type description unit 510 may acquire type description information corresponding to the type information of the terminal by means of searching on the Internet, or the type description unit 510 may acquire corresponding type description information by searching a local memory according to the type information of the terminal (the terminal automatically uploads the type information and corresponding type description information thereof to the search server in advance when a client is installed on the terminal or the terminal is connected to the search server for the first time). Meanwhile, the search server may fail to recognize the type information, for example, the type information of the terminal is not common and cannot be found on the Internet, and the terminal does not upload corresponding type description information previously. In this case, the search server 400 may obtain the type description information of the terminal by interacting with the terminal, that is, the server communication unit 410 first sends a type description request to the terminal according to the type information of the terminal, and then receives type description information of the terminal that is sent by the terminal according to the type description request.

When the search server 400 is a comprehensive server that provides the terminal with a data distribution service and a search service at the same time, the environment information of the search object may be merely type information of the terminal. Because a media resource currently browsed by the terminal is sent by the comprehensive server, the comprehensive server may automatically acquire the resource ID of the media resource to which the search object belongs, then with reference to the type information of the terminal, the search server can obtain a display layout comprising the search object, thereby acquiring the content and context of the search object through calculation with reference to the area information of the search object.

Figure 6:
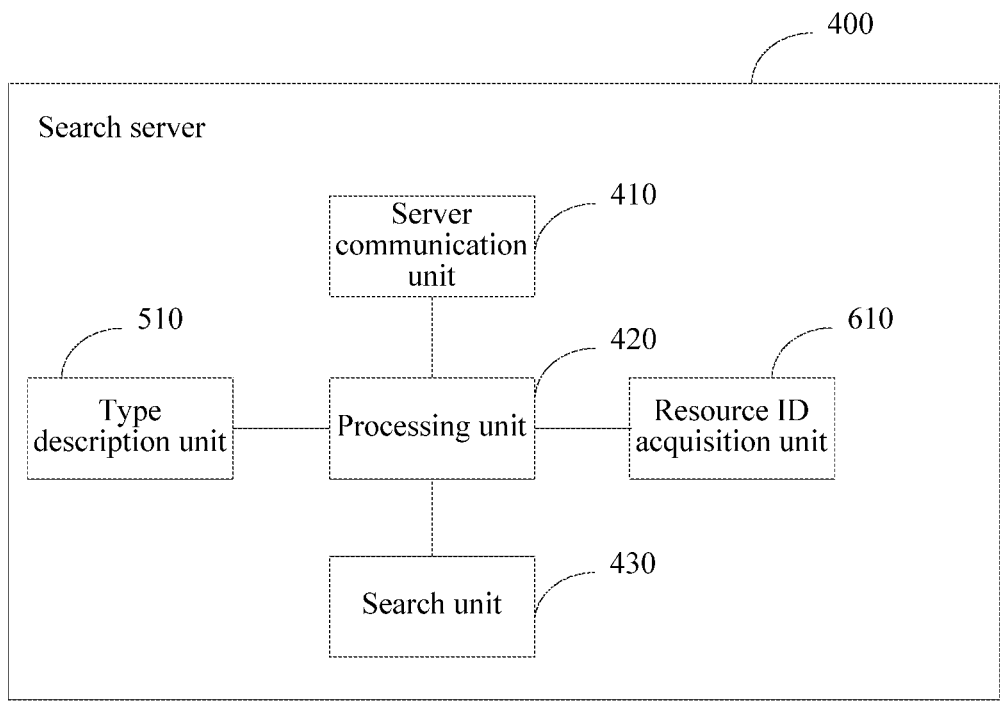
FIG. 6 is an example schematic structural diagram of modules in another implementation manner of a search server according to an embodiment of the present application.

Referring to FIG. 6, in another implementation manner of the embodiment of the present application, the search server further comprises: a resource ID acquisition unit 610.

The type description unit 510 in this implementation manner is the same as the type description unit 510 in the foregoing implementation manner, and is not described in detail again. Besides, when the search server in this implementation manner obtains the type description information of the terminal by interacting with the terminal, the type description unit 510 herein may be omitted.

The resource ID acquisition unit 610 is configured to acquire a resource ID of a media resource to which the search object belongs.

Correspondingly, the processing unit 420 is configured to calculate content of the search object and context of the search object according to the attribute information and environment information of the search object, and the resource ID.

Figure 7:
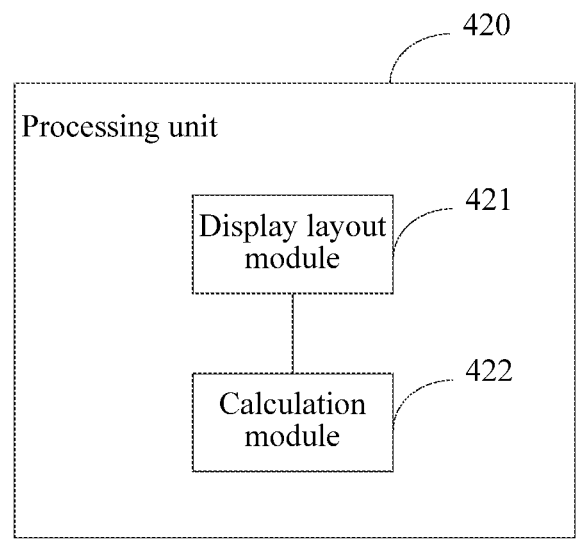
FIG. 7 is an example schematic structural diagram of internal modules of a processing unit according to an embodiment of the present application.

When the attribute information of the search object is area information of the search object, and the environment information of the search object comprises type information of the terminal, the search server 400 may acquire type description information of the terminal according to the type information of the terminal by using the type description unit 510 or the server communication unit 410. In addition, the search server may obtain the resource ID of the media resource to which the search object belongs from the environment information (that is, the environment information of the search object further comprises the resource ID of the media resource to which the search object belongs), and may also automatically acquire the resource ID of the media resource to which the search object belongs according to a resource distribution history by using the resource ID acquisition unit 610. In this case, referring to FIG. 7, the processing unit 420 may comprise: a display layout module 421 and a calculation unit 422.

The display layout module 421 is configured to obtain, according to the type description information of the terminal and the resource ID, a display layout comprising the search object.

The type description information may comprise: a default CSS file, a font, and parameter related information of the terminal. The default CSS file is mainly used in a case in which the media resource to which the search object belongs is a web page, and the search server can obtain a CSS file corresponding to the search object according to the default CSS file and an embedded CSS file of the web page. The parameter related information may be parameter information of the terminal, and may also be a screenshot of the terminal; the search server may carry out analysis according to the screenshot, to obtain parameter information of the terminal. The parameter information generally is a screen size, resolution, and the like of the terminal.

The calculation unit 422 is configured to calculate the content of the search object and the context of the search object according to the attribute information of the search object and the display layout.

After the display layout comprising the search object is determined, a manner of calculating the content of the search object according to the area information in the attribute information of the search object is similar to determining, on the terminal side, the content of the search object according to the area information of the search object, except that the search server does not need to present the display layout.

As shown in FIG. 3, it is assumed that a search object (XXX in FIG. 3) on a web page is displayed on a display screen of a smart phone 310, and corresponding to influencing parameters such as screen size, resolution, font, and default CSS file of the smart phone 310, the web page is displayed in a matching format. Therefore, on the search server side, the search server first obtains, according to parameters such as screen size, resolution, font, and default CSS file of the smart phone 310 (namely, the type description information of the terminal) and a web page URL (namely, the resource ID, where web page content is acquired mainly according to the web page URL), a display layout 320 comprising the search object. In the display layout 320, web page content comprising the search object may be displayed in an analog manner according to a same display format on the terminal side; in other words, the display layout 320 does not need to be presented in a real sense, but only displayed in an analog manner in a memory of the search server.

Figure 8:
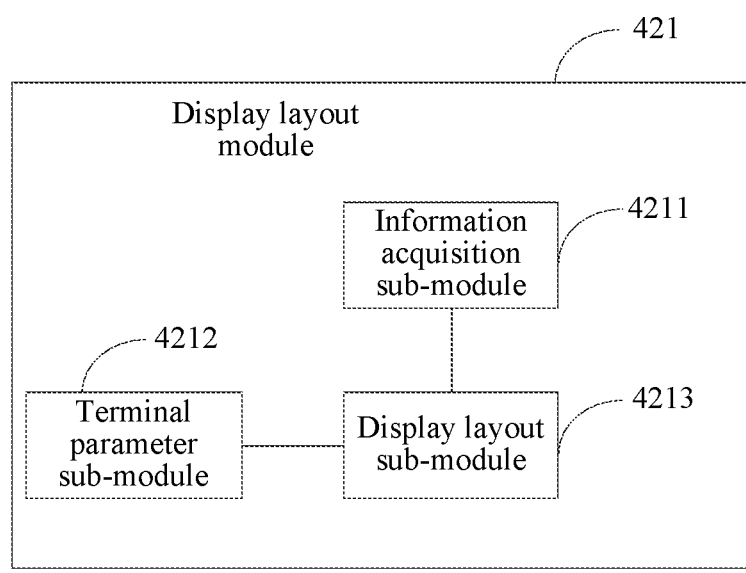
FIG. 8 is an example schematic structural diagram of internal modules of a display layout module according to an embodiment of the present application.

Besides, referring to FIG. 8, when the resource ID is a URI, the display layout module 421 may specifically comprise:

an information acquisition sub-module 4211, configured to acquire version information, document type information, and document content information of the media resource to which the search object belongs according to the URI.

a terminal parameter sub-module 4212, configured to obtain parameter information of the terminal according to the parameter related information of the terminal; and a display layout sub-module 4213, configured to obtain, according to the version information, document type information, and document content information of the media resource to which the search object belongs and the parameter information of the terminal, the display layout comprising the search object.

Figure 9:
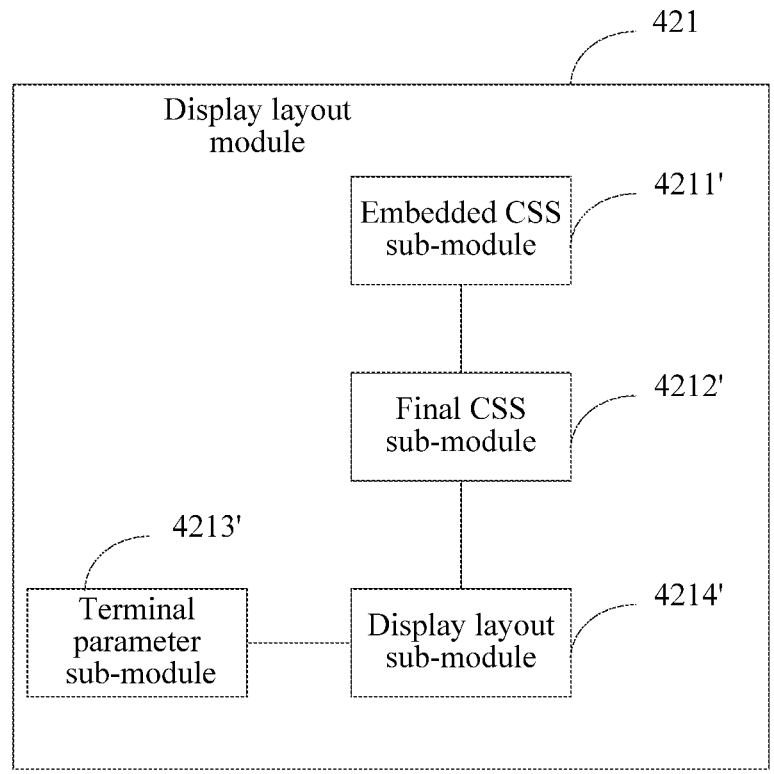
FIG. 9 is another example schematic structural diagram of internal modules of a display layout module according to an embodiment of the present application.

The media resource herein generally is a document, for example, a Word file, an Excel chart, or a PowerPoint file stored on a cloud server. Referring to FIG. 9, when the URI is a URL, that is, when the media resource to which the search object belongs is a web page, the display layout module 421 may specifically comprise:

an embedded CSS sub-module 4211', configured to obtain an embedded CSS file of a webpage to which the search object belongs according to the URL;

a final CSS sub-module 4212', configured to obtain a CSS file corresponding to the search object according to the default CSS file and the embedded CSS file, where the default CSS file is a CSS file that can be supported by the terminal, the embedded CSS file is a CSS file applicable to the web page, and an intersection of the default CSS and the embedded CSS file generally is a CSS file corresponding to the search object, that is, a CSS file actually used by the search object;

a terminal parameter sub-module 4213', configured to obtain parameter information of the terminal according to the parameter related information of the terminal; and a display layout sub-module 4214', configured to obtain, according to the CSS corresponding to the search object, the font and parameter information of the terminal, and the URL, the display layout comprising the search object.

In conclusion, the search server of this embodiment can first determine content of a search object through calculation based on area information and environment information of the search object, then calculate context of the search object, and finally accomplish context-based searching. Therefore, the amount of data sent by a terminal to the search server during searching is reduced, and moreover, electric energy loss of the terminal during searching is reduced.

Figure 10:
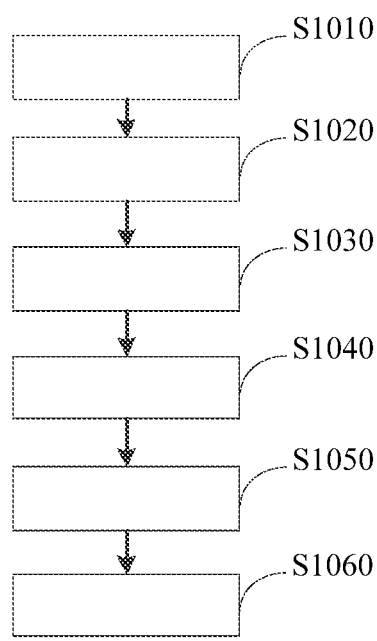
FIG. 10 is an example flowchart of another search method according to an embodiment of the present application.

FIG. 10 is a flowchart of another search method according to an embodiment of the present application, which is implemented based on a terminal and a search server. As shown in FIG. 10, the method comprises the following steps:

S1010: A terminal selects a search object in a media resource according to an input instruction.

The input instruction is generally input by a user through an input unit of the terminal. The input unit herein may specifically be a device such as a keyboard, a touch screen, a mouse, or an image sensor. For example, when browsing a web page by using a smart phone, a user may tap the touch screen of the smart phone to select a word on the web page as a search object, or when accessing a document on a cloud drive by using a tablet computer, a user may select an image in the document as a search object by using a mouse command.

S1020: The terminal acquires attribute information and environment information of the search object.

The attribute information of the search object may be content of the search object or area information of the search object. For the area information, reference may be made to the foregoing description about FIG. 2a, FIG. 2b, and FIG. 2c, and details are not described herein again. The environment information of the search object may be a resource ID of the media resource to which the search object belongs, or a resource ID of the media resource to which the search object belongs and type information of the terminal, or merely type information of the terminal.

S1030: The terminal sends the attribute information and environment information of the search object to a search server.

S1040: The search server receives the attribute information and environment information of the search object which are sent by the terminal.

S1050: The search server calculates content of the search object and context of the search object according to the attribute information and environment information of the search object.

S1060: The search server searches according to the content of the search object and the context of the search object to obtain a search result.

When the environment information of the search object is merely type information of the terminal, before Step S1050, the method further comprises the following step:

S1110: The search server acquires a resource ID of the media resource to which the search object belongs. Correspondingly, Step S1050 is as follows: The search server calculates content of the search object and context of the search object according to the attribute information and environment information of the search object, and the resource ID.

Besides, when the search server cannot recognize the type information of the terminal, before Step S1050, the method further comprises the following steps:

S1210: The search server sends a type description request to the terminal according to the type information of the terminal.

S1220: The terminal receives the type description request sent by the search server.

S1230: The terminal sends type description information of the terminal to the search server according to the type description request.

S1240: The search server receives the type description information of the terminal sent by the terminal.

In addition, the embodiments of the present application also provide a computer readable medium, comprising computer readable instructions which perform the following operations when being executed: executing the operations of steps S110-S160 of the method in the implementation shown in FIG. 10.

In conclusion, in the method according to the embodiment of the present application, a terminal only sends attribute information and environment information of a search object to a search server, and the search server calculates content of the search object and context of the search object according to the attribute information and environment information of the search object, thereby accomplishing a corresponding searching task. The method takes full advantage of a strong computing capability of the search server, decreases data traffic from the terminal to the search server during a searching process, and reduces electric energy loss on the terminal side during the searching process.

Figure 11:
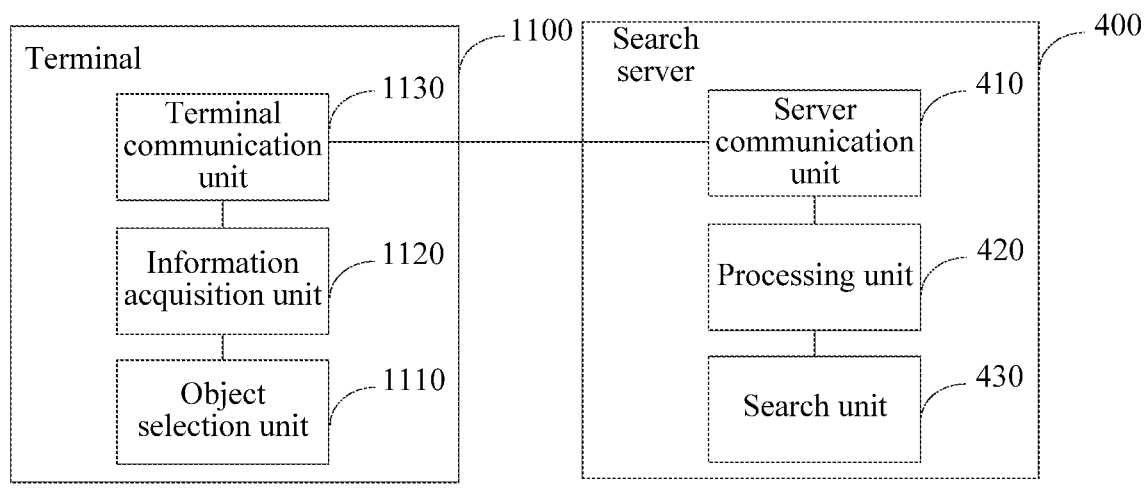
FIG. 11 is an example schematic structural diagram of a search system according to an embodiment of the present application.

FIG. 11 is a schematic structural diagram of a search server according to an embodiment of the present application. As shown in FIG. 11, the search server comprises: a terminal 1100 and a search server 400. Multiple terminals 1100 may be provided.

The terminal 1100 comprises: an object selection unit 1110, an information acquisition unit 1120, and a terminal communication unit 1130.

The object selection unit 1110 is configured to select a search object in a media resource according to an input instruction.

The input instruction is generally input by a user through an input unit of the terminal. The input unit herein may specifically be a device such as a keyboard, a touch screen, a mouse, or an image sensor. For example, when browsing a web page by using a smart phone, a user may tap the touch screen of the smart phone to select a word on the web page as a search object, or when accessing a document on a cloud drive by using a tablet computer, a user may select an image in the document as a search object by using a mouse command.

The information acquisition unit 1120 is configured to acquire attribute information and environment information of the search object.

The attribute information of the search object may be content of the search object or area information of the search object. For the area information, reference may be made to the foregoing description about FIG. 2a, FIG. 2b, and FIG. 2c, and details are not described herein again. The environment information of the search object may be a resource ID of the media resource to which the search object belongs, or a resource ID of the media resource to which the search object belongs and type information of the terminal, or merely type information of the terminal.

The terminal communication unit 1130 is configured to send the attribute information and environment information of the search object to the search server 400.

The search server 400 comprises: a server communication unit 410, a processing unit 420, and a search unit 430.

The server communication unit 410 is configured to receive the attribute information and environment information of the search object which are sent by the terminal.

The processing unit 420 is configured to calculate content of the search object and context of the search object according to the attribute information and environment information of the search object.

The search unit 430 is configured to search according to the content of the search object and the context of the search object to obtain a search result.

When the environment information of the search object is merely type information of the terminal, the search server 400: may further comprise:

a resource ID acquisition unit, configured to acquire a resource ID of the media resource to which the search object belongs. Correspondingly, the processing unit 420 is configured to calculate content of the search object and context of the search object according to the attribute information and environment information of the search object, and the resource ID.

Besides, when the search server cannot recognize the type information of the terminal, the server communication unit 410 is further configured to send a type description request to the terminal 1110 according to the type information of the terminal.

The terminal communication unit 1130 is further configured to receive the type description request; and send type description information of the terminal to the search server 400 according to the type description request.

The server communication unit 410 is further configured to receive the type description information of the terminal.

In conclusion, in the search system according to the embodiment of the present application, a terminal only sends attribute information and environment information of a search object to a search server, and the search server calculates content of the search object and context of the search object according to the attribute information and environment information of the search object, thereby accomplishing a corresponding searching task. The search system takes full advantage of a strong computing capability of the search server, decreases data traffic from the terminal to the search server during a searching process, and reduces electric energy loss on the terminal side during the searching process.

Figure 12:
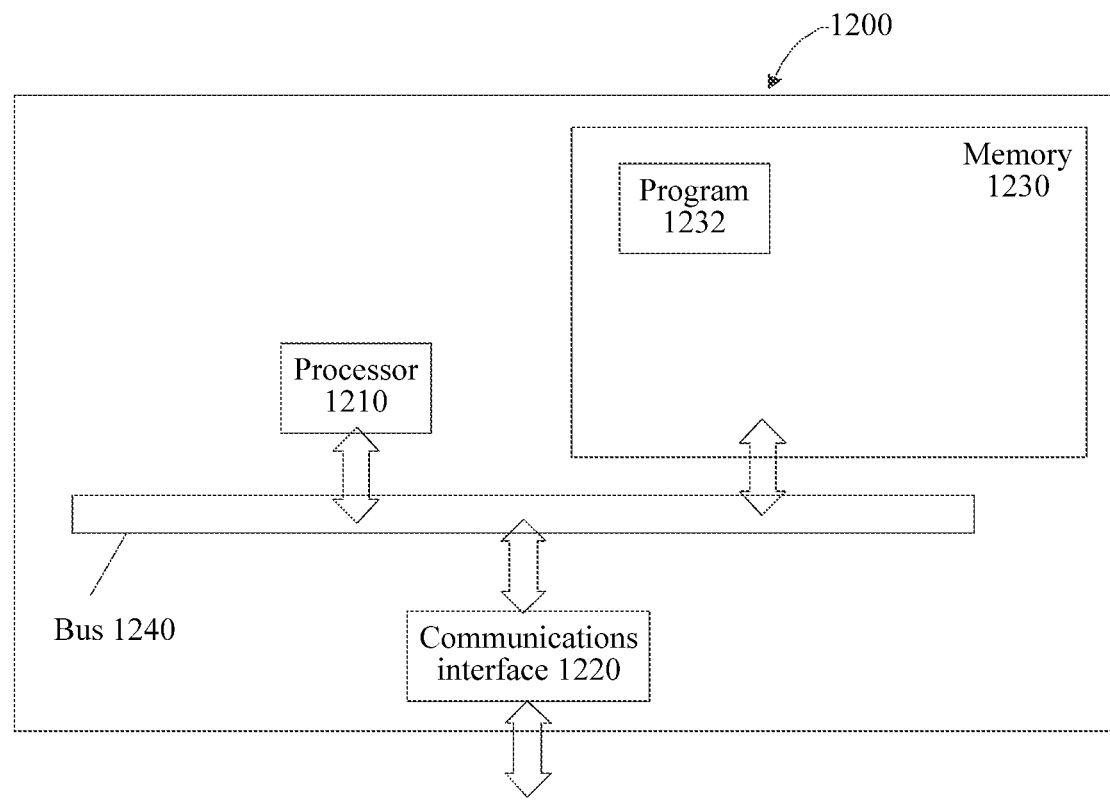
FIG. 12 is an example schematic structural diagram of hardware of a search server according to an embodiment of the present application.

As shown in FIG. 12, FIG. 12 is a schematic structural diagram of hardware of a search server according to an embodiment of the present application, and the embodiment of the present application does not limit the specific implementation of the search server. As shown in FIG. 12, the search server may comprise:

a processor 1210, a communications interface 1220, a memory 1230, and a communication bus 1240, where the processor 1210, the communications interface 1220, and the memory 1230 communicate with each other through the communication bus 1240.

The communications interface 1220 is configured to communicate with network elements such as a terminal.

The processor 1210 is configured to execute a program 1232, and may specifically execute related steps in the method embodiment shown in FIG. 1.

Specifically, the program 1232 may comprise program code, and the program code comprises a computer instruction.

The processor 1210 may be a central processing unit (CPU), or an application specific integrated circuit (ASIC), or may be configured as one or more integrated circuits for implementing the embodiment of the present application.

The memory 1230 is configured to store the program 1232. The memory 1230 may comprise a high-speed random access memory (RAM), and may also comprise a non-volatile memory, for example, at least one disk memory. The program 1232 specifically may comprise:

a processing unit, configured to calculate content of the search object and context of the search object according to the attribute information and environment information of the search object; and a search unit, configured to search according to the content of the search object and the context of the search object to obtain a search result.

For specific implementation of each unit in the program 1332, reference may be made to corresponding unit in the embodiment shown in FIG. 4, and details are not described herein again. It can be clearly understood by a person skilled in the art that, to make the description easy and precise, for a detailed working process of the foregoing devices and units, reference may be made to the corresponding process description in the foregoing method embodiment, and details are not described herein again.

A person of ordinary skill in the art may realize that, the units and method steps of examples described in the embodiments disclosed herein can be implemented by electronic hardware, or a combination of computer software and electronic hardware. Whether these functions are executed by hardware or software depends upon the particular application and design constraint conditions of the technical solution. A person skilled in the art can use different methods to implement the described functions for each particular application, but such implementation should not be regarded as beyond the scope of the present application.

If implemented in the form of software functional units and sold or used as an independent product, the functions may be stored in a computer readable storage medium. Based on such understanding, essence of the technical solution of the present application, or the part that makes contributions to the prior art, or a part of the technical solution can be embodied in the form of a software product. The computer software product may be stored in a storage medium and comprise several instructions for instructing a computer device (for example, a personal computer, a server, or a network device) to execute all or a part of steps of the methods according to the embodiments of the present application. The foregoing storage medium comprises: any medium capable of storing program code, such as a USB flash disk, a removable hard disk, a read-only memory (ROM), a RAM, a magnetic disk, or an optical disc.

The foregoing implementation manners are merely used for describing the present application rather than limiting the present application. A person of ordinary skill in the art may make various modifications and variations without departing from the spirit and scope of the present application, and all the equivalent technical solutions also belong to the scope of the present invention. The patent protection scope of the present application shall be subject to the claims.

What is claimed is:

1. A method, comprising:
receiving, by a device comprising a processor from a terminal, attribute information and environment information of a search object, wherein the environment information of the search object comprises a resource identity (ID) of a media resource to which the search object belongs;
determining content of the search object based on the attribute information;
determining context of the search object based on a display layout of the search object determined according to the environment information of the search object; and
in response to the determining the content and the context, searching according to the content of the search object and the context of the search object to obtain a search result,
wherein the search object is content in the media resource that is presented on the terminal, the attribute information of the search object comprises area information of the search object, and the area information of the search object comprises coordinate information of the search object in the media resource to which the search object belongs, and
wherein the media resource to which the search object belongs is a web page, a Word document, an Excel chart, or a PowerPoint file.

2. The method of claim 1, wherein the coordinate information of the search object in the media resource to which the search object belongs comprises start coordinates of the search object in the media resource to which the search object belongs, and a length of the search object.

3. The method of claim 1, wherein the coordinate information of the search object in the media resource to which the search object belongs comprises opposite corner coordinates of the search object in the media resource to which the search object belongs.

4. The method of claim 1, wherein the coordinate information of the search object in the media resource to which the search object belongs comprises center coordinates and a radius of the search object in the media resource to which the search object belongs.

5. The method of claim 1, wherein the attribute information of the search object comprises the content of the search object.

6. The method of claim 1, wherein the environment information of the search object further comprises type information of the terminal.

7. The method of claim 1, further comprising:
acquiring the resource ID of the media resource to which the search object belongs.

8. The method of claim 1, wherein the resource ID is a universal resource identifier (URI).

9. The method of claim 6, further comprising:
obtaining type description information of the terminal according to the type information of the terminal.

10. The method of claim 6, further comprising:
sending a type description request to the terminal according to the type information of the terminal; and
receiving type description information of the terminal that is sent by the terminal according to the type description request.

11. The method of claim 9, further comprising:
obtaining, according to the type description information of the terminal and the resource ID, the display layout comprising the search object.

12. The method of claim 11, wherein the type description information of the terminal comprises at least one of a default cascading style sheet (CSS) file, a font, or parameter related information of the terminal.

13. The method of claim 12, wherein the parameter related information of the terminal comprises parameter information or a screenshot of the terminal.

14. The method of claim 13, wherein the parameter information of the terminal comprises at least one of a screen size or a resolution of the terminal.

15. The method of claim 12, wherein the resource ID comprises a universal resource identifier (URI).

16. The method of claim 15, wherein the obtaining, according to the type description information of the terminal and the resource ID, the display layout comprising the search object comprises:
acquiring version information, document type information, and document content information of the media resource to which the search object belongs according to the URI;
obtaining parameter information of the terminal according to the parameter related information of the terminal; and
obtaining, according to the version information, document type information, the document content information of the media resource to which the search object belongs, and the parameter information of the terminal, the display layout comprising the search object.

17. The method of claim 15, wherein the URI comprises a universal resource locator (URL); and
the obtaining, according to the type description information of the terminal and the resource ID, the display layout comprising the search object comprises:
obtaining an embedded CSS file of the web page to which the search object belongs according to the URL;

obtaining a CSS file corresponding to the search object according to the default CSS file and the embedded CSS file;

obtaining parameter information of the terminal according to the parameter related information of the terminal; and obtaining, according to the CSS file corresponding to the search object, the font and parameter information of the terminal, and the URL, the display layout comprising the search object.

18. The method of claim 1, wherein the search object comprises at least one of text, an image, a video file, or an audio file.

19. A server, comprising:
a memory that stores executable units; and
a processor, coupled to the memory, that executes the executable units to perform operations of a terminal, the executable units comprising:
a server communication unit configured to receive attribute information and environment information of a search object, wherein the attribute information and the environment information are received from the terminal, and the environment information of the search object comprises a resource identity (ID) of a media resource to which the search object belongs;
a processing unit configured to:
determine content of the search object based on the attribute information and,
determine context of the search object based on a display layout of the search
object determined according to the environment information of the search object; and
a search unit configured to, in response to the determination of the content and the context, search according to the content of the search object and the context of the search object to obtain a search result,
wherein the search object is content in the media resource that is presented on the terminal, the attribute information of the search object comprises area information of the search object, and the area information of the search object comprises coordinate information of the search object in the media resource to which the search object belongs, and
wherein the media resource to which the search object belongs is a web page, a Word document, an Excel chart, or a PowerPoint file.

20. The server of claim 19, wherein the coordinate information of the search object in the media resource to which the search object belongs comprises start coordinates of the search object in the media resource to which the search object belongs, and a length of the search object.

21. The server of claim 19, wherein the coordinate information of the search object in the media resource to which the search object belongs comprises opposite corner coordinates of the search object in the media resource to which the search object belongs.

22. The server of claim 19, wherein the coordinate information of the search object in the media resource to which the search object belongs comprises center coordinates and a radius of the search object in the media resource to which the search object belongs.

23. The server of claim 19, wherein the attribute information of the search object comprises the content of the search object.

24. The server of claim 19, wherein the environment information of the search object further comprises type information of the terminal.

25. The server of claim 19, wherein the executable units further comprise:
a resource ID acquisition unit configured to acquire the resource ID of the media resource to which the search object belongs.

26. The server of claim 19, wherein the resource ID is a universal resource identifier (URI).

27. The server of claim 24, the executable units further comprising:
a type description unit, configured to obtain type description information of the terminal according to the type information of the terminal.

28. The server of claim 24, wherein the server communication unit is further configured to send a type description request to the terminal according to the type information of the terminal; and
receive type description information of the terminal that is sent by the terminal according to the type description request.

29. The server of claim 28, wherein the processing unit comprises:
a display layout module configured to obtain, according to the type description information of the terminal and the resource ID, the display layout comprising the search object.

30. The server of claim 29, wherein the type description information of the terminal comprises at least one of a default cascading style sheet (CSS) file, a font, or parameter related information of the terminal.

31. The server of claim 30, wherein the parameter related information of the terminal comprises parameter information or a screenshot of the terminal.

32. The server of claim 31, wherein the parameter information of the terminal comprises at least one of a screen size or a resolution of the terminal.

33. The server of claim 30, wherein the resource ID is a universal resource identifier (URI).

34. The server of claim 33, wherein the display layout module comprises:
an information acquisition sub-module configured to acquire version information, document type information, and document content information of the media resource to which the search object belongs according to the URI;
a terminal parameter sub-module configured to obtain parameter information of the terminal according to the parameter related information of the terminal; and
a display layout sub-module configured to obtain, according to the version information, document type information, and the document content information of the media resource to which the search object belongs and the parameter information of the terminal, the display layout comprising the search object.

35. The server of claim 33, wherein the URI is a universal resource locator (URL); and
the display layout module comprises:
an embedded CSS sub-module configured to obtain an embedded CSS file of the web page to which the search object belongs according to the URL;
a final CSS sub-module configured to obtain a CSS file corresponding to the search object according to the default CSS file and the embedded CSS file;
a terminal parameter sub-module configured to obtain parameter information of the terminal according to the parameter related information of the terminal; and
a display layout sub-module configured to obtain, according to the CSS file corresponding to the search object, the font and parameter information of the terminal, and the URL, wherein the display layout comprises the search object.

36. The server of claim 19, wherein the search object comprises at least one of text, an image, a video file, or an audio file.

37. A method, comprising:
receiving, by a server comprising a processor from a terminal, a search object in a media resource according to an input instruction;
receiving, by the server from the terminal, attribute information and environment information of the search object acquired by the terminal, wherein the environment information of the search object comprises a resource identity (ID) of the media resource to which the search object belongs;
receiving, by the server, the attribute information and the environment information of the search object which are sent by the terminal;
determining, by the server, content of the search object based on the attribute information;
determining, by the server, context of the search object based on a display layout of the search object determined according to the environment information of the search object; and
in response to the determining the content and the context, searching, by the server, according to the content of the search object and the context of the search object to obtain a search result,
wherein the search object is content in the media resource that is presented on the terminal, the attribute information of the search object comprises area information of the search object, and the area information of the search object comprises coordinate information of the search object in the media resource to which the search object belongs, and
wherein the media resource to which the search object belongs is a web page, a Word document, an Excel chart, or a PowerPoint file.

38. The method of claim 37, wherein the environment information of the search object further comprises type information of the terminal.

39. The method of claim 37, further comprising:
acquiring, by the server, the resource ID of the media resource to which the search object belongs.

40. The method of claim 38, further comprising:
sending, by the server, a type description request to the terminal according to the type information of the terminal; and
receiving, by the server, type description information of the terminal to the server according to the type description request.

41. A computer readable storage device, comprising at least one executable instruction, which, in response to execution, causes a server comprising a processor to perform operations, comprising:
receiving attribute information and environment information of a search object which are sent by a terminal, wherein the environment information of the search object comprises a resource identity (ID) of a media resource to which the search object belongs;
determining content of the search object based on the attribute information;
determining context of the search object based on a display layout of the search object determined according to the environment information of the search object; and
in response to the determining the content and the context, searching according to the content of the search object and the context of the search object to obtain a search result,
wherein the search object is content in the media resource that is presented on the terminal, the attribute information of the search object comprises area information of the search object, and the area information of the search object comprises coordinate information of the search object in the media resource to which the search object belongs, and
wherein the media resource to which the search object belongs is a web page, a Word document, an Excel chart, or a PowerPoint file.

42. A server, comprising a processor and a memory, the memory storing computer executable instructions, the processor being connected to the memory via a communication bus, and when the server operates, the processor executes the computer executable instructions stored in the memory, so that the server executes operations, comprising:
receiving attribute information and environment information of a search object which are sent by a terminal, wherein the environment information of the search object comprises a resource identity (ID) of a media resource to which the search object belongs;
calculating content of the search object based on the attribute information;
calculating context of the search object based on a display layout of the search object determined according to the environment information of the search object; and
in response to the calculating the content and the context, searching according to the content of the search object and the context of the search object to obtain a search result,
wherein the search object is content in the media resource that is presented on the terminal, the attribute information of the search object comprises area information of the search object, and the area information of the search object comprises coordinate information of the search object in the media resource to which the search object belongs, and
wherein the media resource to which the search object belongs is a web page, a Word document, an Excel chart, or a PowerPoint file.

43. The computer readable storage device of claim 41, wherein the environment information of the search object comprises the resource ID of the media resource to which the search object belongs and type information of the terminal.

44. The computer readable storage device of claim 43, wherein the operations further comprise:
sending a type description request to the terminal according to the type information of the terminal; and
receiving type description information of the terminal to the server according to the type description request.

45. The server of claim 42, wherein the operations further comprise:
acquiring the resource ID of the media resource to which the search object belongs.

46. The server of claim 42, wherein the coordinate information of the search object comprises start coordinates of the search object in the media resource to which the search object belongs, and a length of the search object.

47. The server of claim 42, wherein the coordinate information of the search object comprises opposite corner coordinates of the search object in the media resource to which the search object belongs.

\* \* \* \* \*